United States Patent [19]
Britton

[11] 3,735,251
[45] May 22, 1973

[54] SCRATCH PROOF PROBE FOR MANUAL TESTING OF ELECTRICALLY INSULATING COATINGS

[75] Inventor: Orson J. Britton, Pittsford, N.Y.

[73] Assignee: Sybron Corporation, Rochester, N.Y.

[22] Filed: Sept. 23, 1971

[21] Appl. No.: 182,947

[52] U.S. Cl. ................................ 324/54, 324/72.5
[51] Int. Cl. ........................ G01r 31/12, G01r 1/06
[58] Field of Search ................... 324/51, 72.5, 149, 324/54; 174/68.5; 339/59 M, 59 R

[56] References Cited
UNITED STATES PATENTS

| 3,379,963 | 4/1968 | Saurenman | 324/10 |
| 279,557 | 6/1883 | Flint | 339/59 R |
| 3,153,561 | 10/1964 | Cooney | 174/68.5 X |
| 3,046,476 | 7/1962 | McFarland | 324/72.5 X |
| 3,069,620 | 12/1962 | Servos | 324/54 |
| 2,978,637 | 4/1961 | Price et al. | 324/54 |
| 3,417,327 | 12/1968 | Breidenbach | 324/54 |

Primary Examiner—Gerard R. Strecker
Attorney—Theodore B. Roessel

[57] ABSTRACT

A scratch proof probe for electrical testing of coatings such as plastic, glass or the like is provided by sandwiching a number of spring wire reinforcing members between two strips of conductive rubber.

2 Claims, 2 Drawing Figures

Patented May 22, 1973  3,735,251

INVENTOR.
ORSON J. BRITTON

BY *Theodore B Roessel*

ATTORNEY

SCRATCH PROOF PROBE FOR MANUAL TESTING OF ELECTRICALLY INSULATING COATINGS

BACKGROUND OF THE INVENTION

Electrical testing is frequently used to inspect coatings of glass, plastic or other electrically insulating materials for holes or similar imperfections. For example, this form of testing is widely used to check the linings on glassed steel reactors used for processing corrosive chemicals.

The linings of glassed steel reactors are usually tested by sweeping a hand held probe connected to a source of relatively high voltage across the glass surface. Since the surfaces to be inspected are relatively large, it is desirable to have a probe which places a relatively large surface in contact with the glass in order to reduce the amount of time required for testing. In addition, since the vessels frequently have nozzles or other features which present non-uniform surfaces that must be tested, it is desirable to have a probe that can be swept over a variety of different shapes and inserted into different sized openings.

In the past, a brush type probe consisting of a number of fine metal wires arranged in a fan pattern has generally been used for this type of testing. Due to the flexibility and resilience of the wires, a fairly large surface can be readily covered at one time with this type of probe. At the same time, the wire brush is readily adaptable to a variety of different shapes. However, the wires can scratch the coatings. It is an object of this invention to provide a probe which will not scratch coatings of glass, plastic or similar materials.

In some electrical coating testers, such as the ones shown in U. S. Pat. Nos. 2,696,589; 3,069,620 and 3,417,327, conductive rubber has been used to contact the coating. However, the testers disclosed in these patents are not suitable for testing large complicated shapes such as the linings of glassed steel reactors. Another object of this invention is to provide a conductive rubber probe which is suitable for testing shapes of this sort.

Conductive rubber is a specialty product which is available only in a limited number of forms, none of which have the stiffness necessary for a reasonably large hand-held electrical testing probe. It is a further object of this invention to utilize a readily available form of conductive rubber in a probe which is suitable for hand testing of large complicated shapes.

SUMMARY OF THE INVENTION

These objects are achieved by providing a probe having at least one strip of conductive rubber to which is secured at least on flexible reinforcing member. The reinforcing member or members stiffen the probe so that a large area can be covered at once by pressing the strip against the surface to be tested.

DRAWINGS

DETAILED DESCRIPTION

Figure 1:
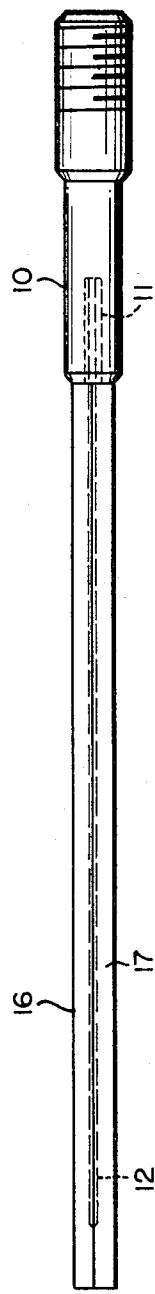
FIG. 1 is a side view of one embodiment of this invention.
Figure 2:
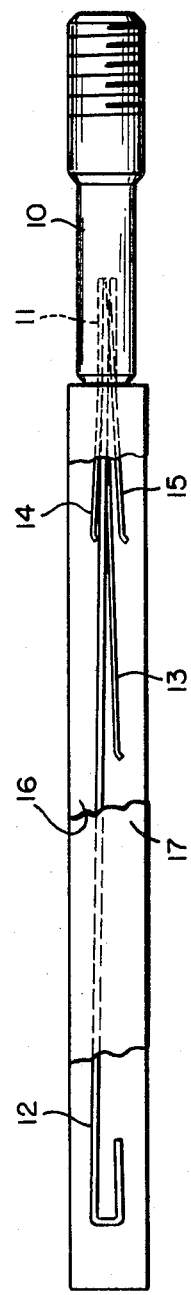
FIG. 2 is a plan view of the probe shown in FIG. 1, partially cut away to show the reinforcing members.

The probe shown in the figures has a metal head 10 threaded at one end so that it can be secured to the handle (not shown) held by the person performing the tests. Electrical connection to the probe is made through the handle and the metal head. A plurality of fine spring wires 12, 13, 14, 15 extend from a bore 11 in the other end of the metal head. These spring wires are sandwiched in between two narrow strips of conductive rubber 16, 17 which provide the probe with conductive surfaces that can be pressed against and swept over a glass coating without fear of scratching the glass. The strips are cut from flat sheets, one of the few readily available forms of conductive rubber.

Since the probe is fairly narrow, it can be inserted into various sized openings and adapted to the numerous other types of surfaces that are encountered in testing a complicated shape such as the lining of a glassed steel reactor. The spring wires provide enough stiffness so that when the flat side of one of the strips is pressed against the surface to be tested, contact can be made over a fairly large area. As a result, a fairly large surface can be tested rapidly by pressing one of the strips against the surface and sweeping the probe sideways over the surface.

When the probe is pressed against the surface to be tested, the maximum stress occurs in the end near the metal head. Thus, it is frequently desirable to provide extra reinforcement in this area. This may be accomplished by using different lengths and sizes of spring wires. In the embodiment shown in the figures one wire 12 extends for substantially the entire length of the conductive rubber strips. A second wire 13, which is approximately the same thickness as the first wire, extends approximately one half the length of the strips. Two additional wires 14, 15 extend for approximately one quarter of the length. Wires 14 and 15 are somewhat thicker than wires 12 and 13. Thus, they provide additional reinforcement in the end nearest the handle.

The strips of conductive rubber and the spring wires may be secured to each other by a number of conventional joining techniques. For example, rubber adhesive may be used to bond the strips together. Another method, which provides a somewhat better bond, is to position the wires between two strips of uncured or incompletely cured rubber and vulcanize the strips under pressure to bond them together.

The foregoing description is merely illustrative of one embodiment of this invention. Many modifications, such as different configurations of conductive rubber and reinforcing members, may be made within the scope of this invention, which is defined by the appended claims.

I claim:

1. A scratch proof probe for manual testing of electrically insulating coatings comprising:
    a. A conductive head adapted to be connected to a handle and to be connected to a voltage source through said handle;
    b. a plurality of elongated conductive spring wire reinforcing members extending from said head; and
    c. a pair of narrow strips of conductive rubber for contacting said insulating coating, said strips being secured to and enveloping said spring wire reinforcing members, with a first one of said spring wire reinforcing members extending for substantially the full length of said conductive rubber strips and at least one of said spring wire reinforcing members being shorter and thicker than said first spring wire reinforcing member.

2. A probe according to claim 1 wherein the pair of conductive rubber strips are bonded together and the spring wire reinforcing members are interposed between said strips.

* * * * *